United States Patent [19]
Fisher et al.

[11] 3,764,532
[45] Oct. 9, 1973

[54] SELF-LUBRICATING SOLID COMPOSITIONS

[75] Inventors: Scott Lewis Fisher, Williamsville, N.Y.; Morris Jay Parker, Houston, Tex.

[73] Assignee: Union Carbide Corporation, New York, N.Y.

[22] Filed: Sept. 21, 1970

[21] Appl. No.: 74,215

Related U.S. Application Data

[63] Continuation-in-part of Ser. No. 608,352, Jan. 10, 1967, abandoned.

[52] U.S. Cl. ................................................. 252/12
[51] Int. Cl. ........................ C10m 7/48, C10m 7/28
[58] Field of Search .................... 252/12, 12.4, 12.2, 252/12.6

[56] References Cited

UNITED STATES PATENTS

| | | | |
|---|---|---|---|
| 2,991,003 | 7/1961 | Petersen | 252/12 |
| R26,088 | 9/1966 | Rulon-Miller et al. | 252/12 |

*Primary Examiner*—Daniel E. Wyman
*Assistant Examiner*—I. Vaughn
*Attorney*—Paul A. Rose, Harrie M. Humphreys and John C. LeFever

[57] ABSTRACT

Self-lubricating solid compositions for use in gas compressors and the like, comprising polytetrafluoroethylene filled with lead and glass additives wherein the glass to lead volume ratio exceeds 3:1.

6 Claims, No Drawings

SELF-LUBRICATING SOLID COMPOSITIONS

This is a continuation-in-part of application Ser. No. 608,352, filed Jan. 10, 1967, now abandoned.

This application relates to self-lubricating article compositions useful in the manufacture of packing rings, rider rings, and the like.

SUMMARY OF THE INVENTION

A self-lubricating solid composition for surface contact with a relatively hard, smooth surface, comprising on a weight basis: 5–25 percent lead, 10–25 percent glass and the balance polytetrafluoroethylene wherein the glass to lead ratio of such solid exceeds 3:1 by volume.

DETAILED DESCRIPTION

This invention substantially increases the useful life of self-lubricating solids such as are used to make gas sealing rings and rider rings for use in gas compressors while greatly decreasing wear on surfaces, such as piston rods, against which such solids rub. Gas sealing rings are used to ensure a gas tight seal around reciprocating parts in gas compressors whereas rider rings are used to provide lateral support for members such as pistons within cylinders where low friction engagement of these parts is desired without the need for gas sealing. One example of a segmented gas sealing ring for which the compositions of this invention are well suited is disclosed in the copending application of Morris J. Parker, Ser. No. 586,886, filed Oct. 14, 1966 now abandoned in favor of continuation application Ser. No. 102,225 filed Dec. 28, 1970.

By employing the compositions of this invention the life of gas sealing rings can be more than doubled in many applications with no detrimental wear on mating metal parts. Because of this increase in useful life, expensive gas sealing ring and rider ring replacement costs are reduced. Additionally, the high glass volume requirement unique to this invention displaces volume otherwise occupied by PTFE, which is extremely expensive by comparison, thereby resulting in considerable cost savings.

According to this invention parts such as gas sealing rings and rider rings can be prepared from solids composed of polytetrafluoroethylene (PTFE), glass and lead, ranging by weight from 5–25 percent lead, 10–25 percent glass, and the balance PTFE. Preferably, 10–25 percent lead, 10–25 percent glass and the balance PTFE by weight is used. The lead is in the form of finely divided powder, the glass in the form of short fine fibers, and the PTFE can be in pellet or powder form. These constituents are blended thoroughly, then molded under heat and pressure to a desired shape and finally the resulting part can be annealed to ensure dimensional stability.

In operation, a thin film of PTFE and lead oxide is formed on the surface against which they rub. The lead oxide in such film is derived from the lead contained in the compositions of this invention which reacts with available gaseous oxygen. Such film is more effective in providing self-lubrication and low wear rate than that resulting from PTFE filled only with glass. In the present invention the glass filler not only serves to make the composition stronger structurally but also results in localized heat generation adjacent the individual glass fibers in contact with the relatively moving metal surface against which the part rubs which generated heat raises the temperature of the PTFE and lead particles. The lead then chemically reacts with available oxygen to form lead oxide which in combination with PTFE forms the heretofore described lubricating film.

The surfaces against which compositions of this invention are rubbed generally comprise relatively hard metal such as stainless steel or cast iron. A beneficial side advantage of the materials of this invention is that fire hazard is substantially reduced due to said PTFE-glass-lead composition being less combustible in the presence of oxygen than PTFE and glass alone.

Typical compositions of this invention are listed in Table I where the specific gravity values used in preparing such Table were: glass 2.20 grams per cc, lead 11.30 grams per cc and PTFE 2.19 grams per cc.

TABLE I

| Composition number | Composition by weight percent | | | Composition by volume percent | | | Volume ratio of lead |
|---|---|---|---|---|---|---|---|
| | Glass | Lead | PTFE | Glass | Lead | PTFE | |
| 1 | 10 | 5 | 85 | 10.3 | 1.0 | 88.7 | 10.3 |
| 6 | 20 | 5 | 75 | 20.7 | 1.0 | 78.3 | 20.7 |
| 7 | 10 | 15 | 75 | 11.3 | 3.3 | 85.4 | 3.45 |
| 12 | 20 | 15 | 65 | 22.6 | 3.3 | 74.1 | 6.85 |
| 13 | 20 | 25 | 55 | 24.9 | 6.1 | 69.0 | 4.1 |
| 14 | 25 | 10 | 65 | 27 | 2.0 | 71 | 13.5 |
| 15 | 15 | 15 | 70 | 16.9 | 3.3 | 79.8 | 5.1 |

As can be seen from Table I, the compositions of this invention are within a range of 70–90 percent PTFE and have a glass to lead volume ration exceeding 3:1.

To demonstrate the improvement which the compositions of this invention represent over the prior art, comparative wear tests were made of two glass-lead-PTFE compositions described in Table II.

TABLE II

| Composition | Composition by weight percent | | | Composition by volume percent | | | Volume ratio |
|---|---|---|---|---|---|---|---|
| | Glass | Lead | PTFE | Glass | Lead | PTFE | (Glass / Lead) |
| No. 15 | 15 | 15 | 70 | 16.9 | 3.3 | 79.8 | 5.1 |
| Rulon–C | 16.9 | 26.7 | 46.4 | 23.9 | 10.1 | 66.0 | 2.3 |

Composition No. 15 is a preferred embodiment of this invention and Rulon-C is described in U. S. Pat. Re. 26,088 issued to Rulon-Miller et al., Sept. 20, 1966. Wear specimens ¼ inch diameter × ½ inch long were rubbed against smooth finished tungsten carbide-coated wear plates at 565 ft./min. surface speed and loading pressures of about 30.5 psi and 61 psi for 45 hours total in air at atmospheric pressure. The extent of wear was measured by weighing the specimens at 5-hour intervals. Average wear results for 55 specimens of material No. 15, and 30 specimens of the Rulon-C material are shown in Table III.

TABLE III

| Composition | Loading Pressure psi | Average Weight Loss in 5-hour Intervals Milligrams | Percent | Normalized Volume Wear Rate |
|---|---|---|---|---|
| No. 15 | 30.5 | 0.078 | 0.0077 | 1.0 |
| Rulon-C | 30.5 | 0.25 | 0.0247 | 2.3 |
| No. 15 | 61 | 3.83 | 0.38 | 1.0 |
| Rulon-C | 61 | 0.735 | 0.073 | 0.14 |

Two other wear tests were also made in which wear specimens were operated at about 30.5 psi and 61 psi loading pressure under conditions identical to those of the Table II test except that the Table III tests were run for a total of 20 hours following preliminary specimen seating operation. Comparison of average specimen weights before and after the test runs gave results shown in Table IV.

TABLE IV

| Composition | Loading Pressure psi | Specimen Initial Weight gm | Weight Loss mg | Percent Weight Loss |
|---|---|---|---|---|
| No. 15 | 30.5 | 1.0121 | 0.49 | 0.048 |
| Rulon-C | 30.5 | 1.1882 | 1.08 | 0.106 |
| No. 15 | 61 | 0.9915 | 11.7 | 0.18 |
| Rulon-C | 61 | 1.1871 | 2.95 | 0.25 |

The observed wear for the No. 15 composition for these two wear tests was about 45 percent that of the Rulon-C composition at 30.5 psi loading under typical identical rubbing conditions. The product of loading pressure P and rubbing velocity V has been widely used as a guide to evaluating and establishing satisfactory usage for filled fluorocarbon materials in load-bearing applications. The above comparative tests were made at P × V values of about 17,000 and 34,000 psi × fpm, which are typical of many commercial nonlubricated applications for these compositions.

Because wear life is inversely proportional to P × V, it is clear that for given values of V the compositions of this invention are extremely desirable because they offer superior wear life at low pressure. Moreover, it is advantageous to operate at low pressure because the relationship between wear life and P × V is not linear and wear life decreases more rapidly as the magnitude of P × V increases. A similar improvement in wear life for compositions of this invention as compared to Rulon-C would be expected at loading pressures below 30.5 psi and somewhat above this level but below 61 psi.

It appears that the ratio of glass to lead is unexpectedly important in achieving superior wear properties for leadglass-PTFE self-lubricating solid compositions since similar constituents were used to prepare the compositions listed in Tables I – III.

Although the foregoing disclosure has described uses for the compositions of this invention relating to packing and rider rings, it should be clear that these compositions are useful in other applications such as sleeve bearings and the like.

What is claimed is:

1. A self-lubricating solid composition for surface contact with a relatively hard, smooth surface where loading pressure is at about 30.5 psi and consisting on a volume basis of: 16.9 percent glass, 3.3 percent lead and 79.8 percent polytetrafluoroethylene whereby the glass to lead volume ratio is 5:1.

2. A self-lubricating solid composition for surface contact with a relatively hard, smooth surface where loading pressure is at about 30.5 psi and consisting on a volume basis of: 11.3 percent glass, 3.3 percent lead and 85.4 percent polytetrafluoroethylene whereby the glass to lead volume ratio is 3.4 : 1.

3. A self-lubricating solid composition for surface contact with a relatively hard, smooth surface where loading pressure is at about 30.5 psi and consisting on a volume basis of 22.6 percent glass, 3.3 percent lead and 74.1 percent polytetrafluoroethylene whereby the glass to lead volume ratio is 6.8 : 1.

4. A method for lubricating a hard smooth surface comprising contacting said surface with a self-lubricating solid composition consisting on a volume basis of: 16.9 percent glass, 3.3 percent lead and 79.8 percent polytetrafluoroethylene whereby the glass to lead volume ratio is 5:1, the contact being such as to provide relative movement between said surface and said composition at loading pressure of about 30.5 psi.

5. A method for lubricating a hard smooth surface comprising contacting said surface with a self-lubricating solid composition consisting on a volume basis of: 11.3 percent glass, 3.3 percent lead and 85.4 percent polytetrafluoroethylene whereby the glass to lead volume ratio is 3.4:1, the contact being such as to provide relative movement between said surface and said composition at loading pressure of about 30.5 psi.

6. A method for lubricating a hard smooth surface comprising contacting said surface with a self-lubricating solid composition consisting on a volume basis of: 22.6 percent glass, 3.3 percent lead and 74.1 percent polytetrafluoroethylene whereby the glass to lead volume ratio is 6.8:1, the contact being such as to provide relative movement between said surface and said composition at loading pressure of about 30.5 psi.

* * * * *